(12) United States Patent
Kaarakainen et al.

(10) Patent No.: US 11,560,943 B2
(45) Date of Patent: Jan. 24, 2023

(54) TRANSMISSION WHEEL AND A METHOD FOR ITS MOUNTING

(71) Applicant: ANDRITZ OY, Helsinki (FI)

(72) Inventors: Pekka Kaarakainen, Lahti (FI); Ari Hannimäki, Lahti (FI); Mika Vuolle, Hollola (FI)

(73) Assignee: Andritz OY, Helsinki (FI)

( * ) Notice: Subject to any disclaimer, the term of this patent is extended or adjusted under 35 U.S.C. 154(b) by 86 days.

(21) Appl. No.: 17/050,652

(22) PCT Filed: Apr. 25, 2019

(86) PCT No.: PCT/FI2019/050335
§ 371 (c)(1),
(2) Date: Oct. 26, 2020

(87) PCT Pub. No.: WO2019/207207
PCT Pub. Date: Oct. 31, 2019

(65) Prior Publication Data
US 2021/0041013 A1    Feb. 11, 2021

(30) Foreign Application Priority Data
Apr. 27, 2018  (FI) ...................................... 20185393

(51) Int. Cl.
*F16H 55/02* (2006.01)
*B23P 15/14* (2006.01)
(Continued)

(52) U.S. Cl.
CPC ............... *F16H 55/12* (2013.01); *B23P 15/14* (2013.01); *F16H 55/17* (2013.01); *F16B 5/06* (2013.01); *F16B 5/08* (2013.01); *F16H 2055/175* (2013.01)

(58) Field of Classification Search
CPC .... F16H 55/02; F16H 2055/175; F16H 55/12; F16H 55/17; B23P 15/14; F16B 5/06; F16B 5/08
See application file for complete search history.

(56) References Cited

U.S. PATENT DOCUMENTS 1,391,719 A  *  9/1921  Conyngham ........... F16H 55/12
474/95
3,111,859 A     11/1963  Malone
(Continued)

FOREIGN PATENT DOCUMENTS

CN    112610679 A  *  4/2021
DE    2740949 A1  *  3/1979
(Continued)

OTHER PUBLICATIONS

International Search Report for PCT/FI2019/050335 dated Jul. 4, 2019, 5 pages.
(Continued)

*Primary Examiner* — Adam D Rogers
(74) *Attorney, Agent, or Firm* — Nixon & Vanderhye P.C.

(57) ABSTRACT

A transmission wheel assembled of at least two segments (1) on a shaft (12), the inner arc surface (3) of which and the shaft (12) have essentially the same radius (R), and which segments' (1) outer surfaces (9) have profiled surfaces that transmit the power of the transmission wheel. Between the segments' (1) welded-together end faces (4) there are gaps on those sections of the end faces (4) that are not welded, which creates a press fit between the shaft (12) and the inner arc surface (3) of the transmission wheel. The weld connecting the transmission wheel segments' (1) end faces (4) may be incomplete, meaning that it does not reach the shaft (12).

10 Claims, 2 Drawing Sheets

(51) Int. Cl.
*F16H 55/12* (2006.01)
*F16H 55/17* (2006.01)
*F16B 5/08* (2006.01)
*F16B 5/06* (2006.01)

(56) References Cited

U.S. PATENT DOCUMENTS

| | | | |
|---|---|---|---|
| 3,159,047 A | | 12/1964 | Dable |
| 3,439,551 A | * | 4/1969 | Militana .................. F16H 55/12 74/447 |
| 4,118,848 A | * | 10/1978 | Goldschmidt .......... B23P 15/14 228/232 |
| 5,057,058 A | | 10/1991 | Crudup |
| 2015/0239076 A1 | | 8/2015 | Klein-Hitpass et al. |

FOREIGN PATENT DOCUMENTS

| | | | | |
|---|---|---|---|---|
| DE | 19821565 B4 | * | 8/2006 | ............ F16D 23/04 |
| DE | 10 2008 046 167 | | 3/2010 | |
| DE | 102019134433 A1 | * | 7/2020 | |
| EP | 0 561 478 | | 9/1993 | |
| EP | 0 684 397 | | 11/1995 | |
| SU | 1753121 A1 | | 8/1992 | |
| WO | WO-2016174322 A1 | * | 11/2016 | ............ F16C 17/028 |

OTHER PUBLICATIONS

Written Opinion of the ISA for PCT/FI2019/050335 dated Jul. 4, 2019, 8 pages.
Chilean Official Action cited in Application No. 202002771, dated Aug. 5, 2021, 12 pages.
Chilean Search Report cited in Application No. 202002771, dated Aug. 5, 2021, 3 pages.

* cited by examiner

TRANSMISSION WHEEL AND A METHOD FOR ITS MOUNTING

RELATED APPLICATION

This application is the U.S. national phase of International Application PCT/FI2019/050335 filed Apr. 25, 2019, which designated the U.S. and claims priority to Finnish patent application FI 20185393 filed Apr. 27, 2018, the entire contents of each of which are hereby incorporated by reference.

BACKGROUND

The present invention applies to transmission wheels and the mounting of transmission wheels on a shaft.

It is often necessary to add a transmission wheel to a shaft during a new installation or the replacement of a worn transmission wheel. In such cases, it is not always possible to mount the transmission wheel in one piece, but instead, it must be divided into two or more segments that are attached together and around the shaft. The split in two structure is known from, for example, publications DE102008046167 and EP0684397, in which, for example, a precision-manufactured transmission wheel is divided by breaking it into two precise, matching parts and joined on the shaft with a press fit. DE102008046167 presents a solution where the halves of a transmission wheel are axially joined with a press fit and, if needed, can be finished by welding the break surfaces together. EP0684397 presents how the halves of a transmission wheel are first re-joined in a spot with a smaller diameter, for example by beam welding at the side, and then mounted on a shaft by means of temperature difference.

EP561478 presents how plastic halves of a transmission wheel, which may have shoulders for aligning the segments, are joined together with a screw joint. The publication mentions that the joining can also be done by means of bonding or welding, but it does not specify the welding method. Plastic pieces with facing surfaces can generally be welded, for example, through ultrasonic welding. Power transmission from the shaft to the transmission wheel is realized by means of a key.

SUMMARY OF THE INVENTION

Especially in the extremely large conveyors of the wood-processing industry, chains and transmission wheels, such as pulleys, gear wheels and sprocket wheels, come into conditions where they are exposed to the elements and abrasive materials, such as sand. During maintenance, the mounting of new transmission wheels on a shaft must typically be done in a situation where the shaft cannot be removed from the machine, in which case the transmission wheel must be divided into segments before mounting. The segments are preferably of equal size and preferably their number is 2 to 4 pieces. The split structure must be assembled into a transmission wheel such that the segments are placed on the shaft without play and with the fit preferably tight enough to transmit the entire torque directed to the joint. Even in new assemblies, it is difficult to achieve a sufficiently tight press fit for several transmission wheels with the same diameter that are parallel-mounted on a long and thick shaft. The transmission wheels of wood-processing industry conveyors are typically over 200 mm in shaft diameter and radially over 15 mm thick even at their thinnest.

The purpose of the invention is to achieve a new kind of transmission wheel welded together from segments that meets the requirements for mounting and maintenance, as well as a mounting method for it.

A transmission wheel usually consists of two segments. There are also other options for the division. For example, flame cutting the segments of extremely large transmission wheels with almost a meter's diameter from steel plate in three or four sections may save plate material. Transmission wheel segments are preferably of equal size, but they may also consist of larger and smaller sectors if together they form a full transmission wheel. When placed on a shaft, a gap must be left between the ends of the segments, which shrinks during welding, bringing about a press fit.

The welding should not damage functional surfaces, such as the shaft surface, so that a new transmission wheel can be replaced in the same place, if needed. Arc-welding is a particularly advantageous joining method because the residual stresses of a wide weld shrink the joint and cause a particularly great force shrinking the gap left in the joint. The making of keyways on the shaft and transmission wheel, which increases costs and adds extra work phases, can usually be avoided because a press fit can transmit the entire load without a key.

Transmission wheel segments have on their inner arc surface substantially the same radius as the transmission wheel shaft on which the transmission wheel segments are mounted. The outer surfaces of the transmission wheel segments have profiled surfaces to achieve power transmission. The outermost edge of the end faces and/or the side faces are preferably beveled to form a welding groove for a weld that produces a strong pressing effect. The weld does not reach the shaft, only deep enough to prevent stresses. In that case, it is advantageous to weld, and the weld can easily be ground out for removal of the transmission wheel when it has worn out or been damaged. Another advantage of an incomplete weld is that welds of a cogged transmission wheel that have been worn one-sided can be ground out, and the pieces can be turned and the joint re-welded, achieving a serviceable transmission wheel without replacing parts.

Mounted on a shaft, the end faces must not touch when placed on the shaft, and a gap must not be left between the shaft and transmission wheel. The shrinking force caused by the weld is prevented, if no gap is left between the end faces. For this reason, the transmission wheel segments must not form full sectors; the segments must be sufficiently incomplete. Here, full sectors refer to sectors that together form a full circle, and the sectors end mid-way of the opposing end faces. When both end faces of a transmission wheel segment are left at most 3 mm incomplete of the full sector according to the number of segments, a gap of at most about 6 mm forms between them during mounting, which can be considered as the practical maximum. If the gap is too wide, there is too much variation in welding quality and also in the power transmission capacity of the press fit. For this reason, transmission wheel segments must be left at least 0.2 mm incomplete at both ends compared to full sectors. During mounting, the gap that then forms between the ends of the transmission wheel segments, depending on manufacturing tolerances, comes to at least about 0.4 mm. Due to welding, the gap typically shrinks by 0.2 to 0.6 mm. The sectors covered by the transmission wheel segments are incomplete at the ends of these full sectors, in which case even after welding, a discernible gap is left between the segments in the end face sections that are not welded. The best result is achieved by minimizing gap width such that the end faces still do not touch after being welded.

Preferably, the inner edge of transmission wheel segment end faces has either a shoulder or a notch corresponding to a shoulder, protecting the shaft from weld spatter and damage, thereby facilitating the replacement of the transmission wheel. The shoulder can also serve as a backing strip for the weld, in which case the gap between the ends can be up to 10 mm. The shoulder end face and notch bottom must not be in contact with each other during mounting so as not to disrupt the transmission wheel's shrink fit against the shaft. In order for the shoulder to prevent shaft damage, its height must be at least equal to the length of the gap between the end faces. In order for transmission wheel segments to fit together during mounting, they must have either one of the aforementioned shoulders and one of the aforementioned notches or two shoulders or two corresponding notches. In order for all the manufactured segments to be identical and their manufacturing, storage and supply therefore simpler, a solution with one notch and one shoulder is preferable.

A joint that transmits stress especially well is achieved for the joint between the transmission wheel and shaft when the segments are tightened to the shaft with tightening tools before the welded joints that further tighten the joints. Transmission wheel segments are mounted on the shaft as follows;
  transmission wheel segments are placed on the shaft with the end faces facing such that any shoulder is against a notch,
  tightening tools are placed on the outer surfaces of transmission wheel segments,
  transmission wheel segments are placed such that the target gap width is left between segment ends,
  tightening members of the tightening tools are tightened to eliminate the gap between the transmission wheel segments and the shaft,
  once the target tensile force has been achieved, the transmission wheel segments are welded together, and tightening tools are unfastened and removed.

BRIEF DESCRIPTION OF THE FIGURES

The invention is described more closely in the context of preferable embodiments with reference to the figures provided, where.

DETAILED DESCRIPTION OF THE INVENTION

Figure 1:
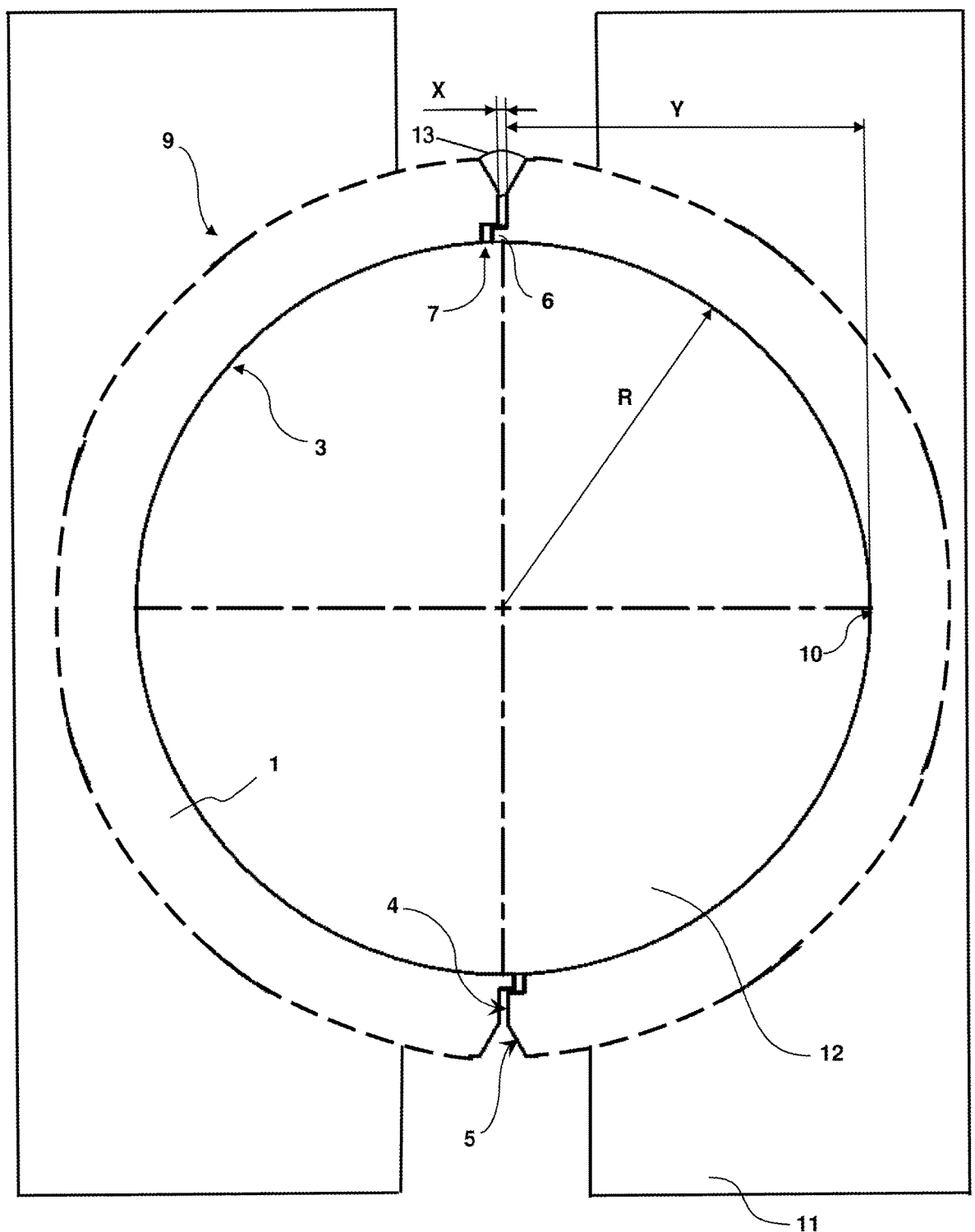
FIG. 1 presents a side view of two transmission wheel segments according to the preferable embodiment placed against each other.

FIG. 1 presents a side view of two transmission wheel segments 1 according to the preferable embodiment placed against each other such that their inner surfaces 3 sit on a shaft 12 with substantially the same radius. The outer surfaces 9 of the transmission wheel segments 1 have profiled surfaces aligned with the shaft for power transmission purposes. The ends of the transmission wheel segments 1 have end faces 4, the outer surfaces of which preferably have bevels 5 that form between them a welding groove. The bevel 5 could be shaped like, for example, the letter J in order to form a U groove.

In order to ensure that the shrinkage caused by welding creates a strong press fit, the end faces 4 must not touch each other even after welding. For this reason, the transmission wheel segments must be incomplete enough compared to a full sector according to the segment division, and a gap with the width X must be left between the end faces 4, in which case the width of the aforementioned incompleteness is X/2. In case of two transmission wheel segment halves, the width of the incompleteness X/2 is the inner arc surface's 3 radius R minus measurement Y from the level of the end faces 4 to the highest point 10 of the inner arc surface 3 of the transmission wheel segment 1. The segments 1 are placed on the shaft 12 such that the gap width X is sufficient in each gap between the end faces 4.

Preferably, the inner corners of the end faces 4 have either a shoulder 6 or a corresponding notch 7. The shoulder 6 should be longer than the width of the gap X left between the end faces 4, and the corresponding notch 7 should be deep enough that the shoulder 6 does not reach its end face and prevent the weld 13 from shrinking and a press fit from forming on the shaft. The thickness of the shoulder 6 must not exceed the depth of the notch 7 so that the side faces of the shoulder 6 and notch 7 do not cause friction and hinder mounting. The shoulder 6 can be thick enough to also serve as a backing strip. The joining of the end face can also be done such that the end faces 4 have only notches 7 on at least one side of the joint. In that case, the notch is not filled by a shoulder 6. The end faces 4 can then be welded together by their other surfaces, at least for the most part. The notch 7 ensures a sufficient gap between the end faces 4 at the notch 7. In that case, even minor incompleteness of the weld on the end faces 4 will not necessarily hinder weld shrinking because the narrow incomplete area will heat during welding, making it easily deforming, and thus will not materially hinder the shrinkage.

The joining of the end face can also be done such that the end faces 4 have only notches 7 on at least one side of the joint. In that case, the notch is not filled by a shoulder 6. The end faces 4 can then be welded together by their other surfaces, at least for the most part. The notch 7 ensures a sufficient gap between the end faces 4 at the notch 7. In that case, even minor incompleteness of the weld on the end faces 4 will not necessarily hinder weld shrinking because the narrow incomplete area will heat during welding, making it easily deforming, and thus will not materially hinder the shrinkage.

Before the welding phase, both sides of the transmission wheel segment 1 joints will be fitted with tightening tools 11, which will be used to tighten the transmission wheel segments 1 to the shaft without play, for example with bolts or separate clamps. The tightening has no significant impact on the frictional force of the press fit, if the segment sits on the shaft without play. Otherwise, the frictional force is left smaller than planned when the gap is not removed until due to the shrinkage caused by the welding.

Figure 2:
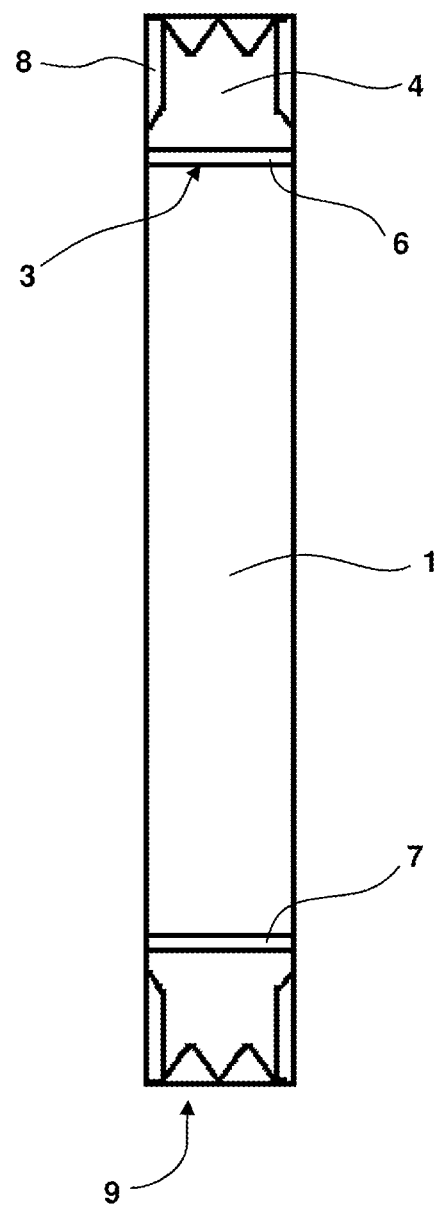
FIG. 2 presents a transmission wheel segment to be welded at the sides.

FIG. 2 presents a transmission wheel segment in accordance with a preferable embodiment where the outer surface 9 has a transverse profiled surface in regard to the shaft 12. The transmission wheel segment end faces 4 have bevels 8 on both side edges, serving as surfaces of the welding groove.

The invention claimed is:
1. A transmission wheel comprising:
  at least two segments on a shaft, wherein an inner arc surface of each of the at least two segments and the shaft have the same radii and the at least two segments includes a first segment and a second segment, and
  outer surfaces of the at least two segments include profiled surfaces configured to transmit power of the transmission wheel, end faces on each of the at least two segments, wherein a first end face of the end faces is on the first segment faces a second end face of the end faces is on the second segment, and a weld connecting the first end face and the second end face, wherein a first section of the first end face faces a second section of the second end face;

wherein the first section and the second section are not welded, and wherein a gap is between the first section of and second section.

2. The transmission wheel according to claim 1, wherein the weld connecting the first end face and the second end face does not extend to the shaft.

3. The transmission wheel according to claim 1, wherein an inner edge region of at least one of the first end face and the second end face includes a notch.

4. The transmission wheel according to claim 1, wherein an inner edge region of at least one of the first end face and the second end face includes a shoulder within a notch.

5. A transmission wheel comprising:

arc-shaped segments assembled on a shaft, wherein an inner arc surface of each of the arc-shaped segments is seated on an outer surface of the shaft;

outer surfaces of each of the arc-shaped segments include profiled surfaces configured to transmit power of the transmission wheel, end faces on opposite ends of each of the arc-shaped segments, wherein the end faces include a first end face on a first of the arc-shaped segments and a second end face on a second of the arc-shaped segments, and the first end face faces the second end face;

a weld connecting the first end face and the second end face, and a first section of the first end face faces a second section of the second end face, wherein the first section and the second section are separated by a gap and are not welded.

6. The transmission wheel of claim 5 wherein the weld is spaced apart from the shaft.

7. The transmission wheel of claim 5, wherein at least one of the end faces on each of the arc-shaped segments includes an inner edge region adjacent the shaft, and the inner edge region includes a notch.

8. The transmission wheel according to claim 7, wherein the inner edge region of each of the arc-shaped segments includes a shoulder within the notch.

9. A method for mounting a transmission wheel on a shaft with a press fit, the method includes:

arranging transmission wheel segments in an annular array on the shaft, wherein gaps are each between opposing pairs of end faces of the transmission wheel segments and the gaps collectively are at least 0.2 mm during the arranging step, wherein an outermost edge and/or side of the edges of each of the end faces are beveled such that a welding groove is formed between each of the pairs of the opposing end faces, tightening tools are placed on outer surfaces of two of the transmission wheel segments and the tightening tools are applied to push together the opposing end faces, welding the transmission wheel segments together by forming welds in the welding grooves, wherein the welding step leaves the gaps between each of the pairs of the opposing end faces and the gaps are each at a section of each of the pairs of opposing end faces between the weld and the shaft, and removal of the tightening tools after the welding.

10. The method of claim 9, wherein the step of welding shrinks the gaps.

* * * * *